June 29, 1926.
C. C. FARMER
FLUID PRESSURE BRAKE
Filed May 21, 1924
1,590,356
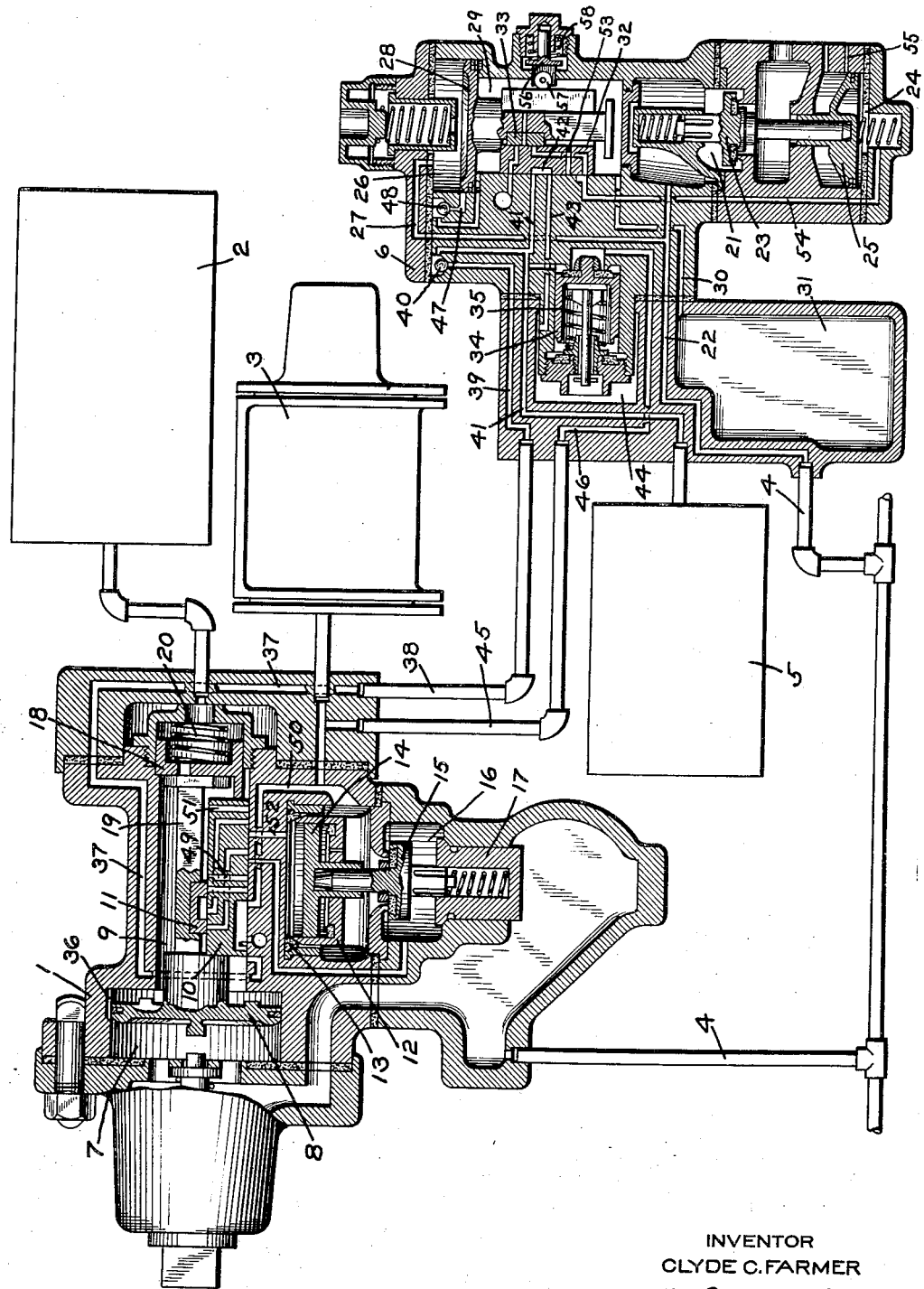
INVENTOR
CLYDE C. FARMER
BY *Wm. M. Cady*
ATTORNEY Patented June 29, 1926.

1,590,356

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed May 21, 1924. Serial No. 714,993.

This invention relates to fluid pressure brakes and has for its principal object to provide improved means for securing a high degree of pressure in an emergency application of the brakes.

In the accompanying drawing, the single figure is a diagrammatic view, partly in section, of a fluid pressure brake equipment embodying my invention.

According to my invention, high pressure in an emergency application of the brakes is secured by employing a supplemental reservoir, a triple valve device having means for charging the supplemental reservoir with fluid under pressure, and a valve device operated upon a sudden reduction in brake pipe pressure for supplying fluid from the supplemental reservoir to the brake cylinder.

As shown in the drawing, the equipment comprises a triple valve device 1 of the retarded release type, an auxiliary reservoir 2, a brake cylinder 3, a brake pipe 4, a supplemental reservoir 5, and a vent valve device 6.

The triple valve device 1 may comprise a casing having a piston chamber 7 connected to the brake pipe 4 and containing a piston 8 and a valve chamber 9, connected to the auxiliary reservoir 2 and containing a main slide valve 10 and a graduating slide valve 11 adapted to be operated by piston 8. Contained in the triple valve casing is an emergency piston cylinder 12 which is clamped in position so as to engage a gasket 13. Said piston cylinder contains an emergency piston 14 for operating an emergency valve 15 contained in valve chamber 16, said chamber communicating with the brake pipe 4 by way of a check valve 17 in the usual manner.

For controlling the retarded release of the brakes, a yielding stop member 18 is provided which engages both the piston stem 19 and the slide valve 10, said member being subject to the pressure of a spring 20.

The vent valve device 6 may comprise a casing having a valve chamber 21, connected by passage 22 to brake pipe 4 and containing a brake pipe vent valve 23 and a piston chamber 24 containing a quick action piston 25 operatively connected to valve 23.

The vent valve casing also has a piston chamber 26, connected by passage 27 to the brake pipe 4 and containing a piston 28 and a valve chamber 29 connected by passage 30 to a quick action chamber 31 and containing a slide valve 32 and an auxiliary slide valve 33 mounted on and having a movement relative to the slide valve 32 and adapted to be operated by piston 28.

For controlling the supply of fluid from the supplemental reservoir 5 to the brake cylinder in an emergency application of the brakes, a valve piston 34 is provided, which is adapted to seat upon extreme movement in either direction and which is subject to the pressure of a spring 35.

In operation, when the brake pipe 4 is charged with fluid under pressure, fluid flows to piston chamber 7 and thence through the feed groove 36 to valve chamber 9, charging the auxiliary reservoir 2 with fluid under pressure.

In the normal release position of the triple valve device, as shown in the drawing, fluid also flows from valve chamber 9, through passage 37, pipe 38, passage 39, past check valve 40, and thence through passage 41 to the supplemental reservoir 5, charging the same with fluid under pressure. In the normal position of the emergency slide valve 32, as shown in the drawing, passage 41 is connected through cavity 42 with a passage 43 leading to chamber 44, which chamber is open to the spring side of the valve piston 34. The brake cylinder 3 is connected through pipe 45 and passage 46 with the chamber at the right hand face of valve piston 34 and when said piston is seated at the right, the inner seated area is subject to brake cylinder pressure. The outer seated area of said valve piston is connected to passage 41 and is thus subject to supplemental reservoir pressure.

The piston chamber 26 is connected through passage 27 with brake pipe 4, and from chamber 26, fluid from the brake pipe flows through passage 47 past check valve 48 to valve chamber 29 and thence through passage 30 to quick action chamber 31, charging the same with fluid under pressure.

Upon a sudden reduction in brake pipe pressure to effect an emergency application of the brakes, the triple valve piston 8 moves outwardly to emergency position and the main slide valve 10 is moved so that a restricted port 49 registers with passage 50, leading to the brake cylinder. Fluid is then supplied from the auxiliary reservoir to the brake cylinder at a predetermined restricted rate. A port 51 in slide valve 10 also registers with passage 52 leading to the chamber above the emergency piston 14, so that said piston is operated to open the valve 15, permitting the flow of fluid from the brake pipe to the brake cylinder.

The piston 28 of the vent valve device is also operated by the sudden reduction in brake pipe pressure and the slide valve 32 is shifted to a position in which passage 43 is connected to a port 53 through the slide valve. Passage 54 leading to piston chamber 24 is uncovered by the movement of slide valve 32, so that fluid under pressure is supplied from the valve chamber 29 and the quick action chamber 31 to piston chamber 24.

The emergency piston 25 is then shifted to open the valve 23, so that fluid is vented from the brake pipe to the atmosphere at a rapid rate to produce serial quick action throughout the train.

When the piston 25 is in emergency position, a restricted atmospheric port 55 is opened to piston chamber 24, so that fluid is vented from valve chamber 29 and the quick action chamber 31 at a predetermined restricted rate. As the pressure in valve chamber 29 is thus reduced, the pressure in chamber 44 is correspondingly reduced by flow through passage 43 and port 53 and at the same time brake cylinder pressure, acting on the inner seated area of valve piston 34, is being built up by flow from the auxiliary reservoir to the brake cylinder. After a predetermined time, dependent upon the building up of brake cylinder pressure and the reduction in pressure in chamber 44, the valve piston 34 will be shifted toward the left, so as to open communication from the supplemental reservoir 5 to the brake cylinder, so as to provide a high pressure in the brake cylinder in an emergency applications of the brakes.

By means of the above construction, in an emergency application of the brakes, fluid under pressure is initially supplied from the brake pipe to the brake cylinder at a rapid rate by the opening of the emergency valve 15 to ensure movement of the brake cylinder piston to application position and then the brake cylinder pressure is built up by flow at a restricted rate from the auxiliary reservoir, through the restricted port 49 and finally, after a predetermined time, the pressure in the brake cylinder is rapidly increased to a high pressure by fluid supplied from the supplemental reservoir.

In order to hold the slide valve 32 to its seat against fluid pressure acting below the valve, a pressure device may be provided comprising a member 56 having a roller 57 acting on the piston stem 58 of piston 28 and a spring 58 acting on the member 56.

Having now described my invention, what I claim as new and desire to secure by Letters Patent, is:—

1. In a fluid pressure brake, the combination with a brake pipe, brake cylinder, and a valve device operated upon a reduction in brake pipe pressure for supplying fluid to the brake cylinder, of a source of fluid under pressure, a valve mechanism operated only upon a sudden reduction in brake pipe pressure for venting fluid from the brake pipe, and means controlled by said valve mechanism for supplying fluid from said source to the brake cylinder.

2. In a fluid pressure brake, the combination with a brake pipe, brake cylinder, auxiliary reservoir, and a valve device operated upon a reduction in brake pipe pressure for supplying fluid from the auxiliary reservoir to the brake cylinder, of an additional source of fluid under pressure, a valve mechanism operated only upon a sudden reduction in brake pipe pressure for venting fluid from the brake pipe, and means operated by said valve mechanism for supplying fluid from said additional source to the brake cylinder.

3. In a fluid pressure brake, the combination with a brake pipe, brake cylinder, auxiliary reservoir, and a valve device operated upon a sudden reduction in brake pipe pressure for supplying fluid from the auxiliary reservoir to the brake cylinder, of an additional source of fluid under pressure, a valve mechanism operated only upon a sudden reduction in brake pipe pressure for venting fluid from the brake pipe, and means controlled by said valve mechanism for supplying fluid from said additional source to the brake cylinder.

4. In a fluid pressure brake, the combination with a brake cylinder and brake pipe, of a source of fluid under pressure, means subject to the opposing pressure of a chamber normally charged with fluid under pressure and the brake cylinder for controlling the supply of fluid from said source to the brake cylinder, and means operated upon a sudden reduction in brake pipe pressure for venting fluid from said chamber.

5. In a fluid pressure brake, the combination with a brake cylinder and brake pipe, of a source of fluid under pressure, means subject to the opposing pressures of a chamber normally charged with fluid under pressure and the brake cylinder for controlling the supply of fluid from said source to the brake cylinder, and means operated upon a sudden reduction in brake pipe pressure for venting fluid from said chamber at a predetermined restricted rate.

6. In a fluid pressure brake, the combination with a brake cylinder, auxiliary reservoir, brake pipe, and a valve device operated upon a sudden reduction in brake pipe pressure for supplying fluid from the brake pipe to the brake cylinder and from the auxiliary reservoir to the brake cylinder at a restricted rate, of an additional source of fluid under pressure and a valve mechanism operated upon a sudden reduction in brake pipe pressure for supplying fluid from said additional source to the brake cylinder.

7. In a fluid pressure brake, the combination with a brake cylinder, auxiliary reservoir, brake pipe, and a valve device operated upon a sudden reduction in brake pipe pressure for supplying fluid from the brake pipe to the brake cylinder and from the auxiliary reservoir to the brake cylinder at a restricted rate, of an additional source of fluid under pressure and a valve mechanism operated upon a sudden reduction in brake pipe pressure for venting fluid from the brake pipe and for supplying fluid from said additional source to the brake cylinder.

8. In a fluid pressure brake, the combination with a brake cylinder and brake pipe, of a source of fluid under pressure, means subject to the opposing pressures of the brake cylinder and a chamber for controlling the supply of fluid from said source to the brake cylinder, and means subject to brake pipe pressure for charging said chamber with fluid under pressure and operated upon a sudden reduction in brake pipe pressure for venting fluid from said chamber.

9. In a fluid pressure brake, the combination with a brake cylinder and brake pipe, of a source of fluid under pressure, means subject on one side to the pressure of a chamber and on the opposite side to the pressure of said source and the brake cylinder for controlling communication from said source to the brake cylinder and means operated upon a sudden reduction in brake pipe pressure for venting fluid from said chamber.

10. In a fluid pressure brake, the combination with a brake cylinder, brake pipe, auxiliary reservoir, and a valve device operated upon a sudden reduction in brake pipe pressure for supplying fluid to the brake cylinder at a predetermined restricted rate, of an additional source of fluid under pressure, means subject on one side to the pressure of a chamber and on the opposite side to the pressure of said source and the pressure in the brake cylinder, for controlling communication from the additional source to the brake cylinder, and means operated upon a sudden reduction in brake pipe pressure for venting fluid from said chamber at a predetermined restricted rate In testimony whereof I have hereunto set my hand.

CLYDE C. FARMER.